United States Patent [19]

Suda

[11] Patent Number: 4,791,729

[45] Date of Patent: Dec. 20, 1988

[54] ELECTRONIC COMPASS AND METHOD

[76] Inventor: Raymond A. Suda, 7000 Pernod, St. Louis, Mo. 63139

[21] Appl. No.: 41,205

[22] Filed: Apr. 22, 1987

[51] Int. Cl.$^4$ .............................................. G01C 17/30
[52] U.S. Cl. ........................................ 33/356; 33/361; 364/457
[58] Field of Search ................. 33/356, 357, 361, 362; 73/1 E; 364/424, 449, 571, 550, 559, 457, 556

[56] References Cited

U.S. PATENT DOCUMENTS

| | | | |
|---|---|---|---|
| 4,179,741 | 12/1979 | Rossani | 33/356 X |
| 4,424,631 | 1/1984 | Franks | 33/361 |
| 4,442,609 | 4/1984 | Senoo | 33/356 |
| 4,622,754 | 11/1986 | Chujo et al. | 33/356 |
| 4,660,161 | 4/1987 | Okada | 33/356 X |

Primary Examiner—William D. Martin, Jr.
Attorney, Agent, or Firm—Senniger, Powers, Leavitt and Roedel

[57] ABSTRACT

An electronic compass and method. The electronic compass includes circuitry for generating a control signal and circuitry responsive to the control signal for producing reference signals having a frequency established by the control signal. The compass also includes circuitry for phase shifting the reference signals to generate an output signal shifted by a phase shift which is a function of the angle between a reference heading of the compass and the direction of the magnetic flux lines of the earth's magnetic field in a local area. Further, the compass includes circuitry for monitoring the frequency of one of the reference signals, for varying the control signal to thereby cause reference signals having a predetermined frequency, and for measuring the phase shift between the monitored reference signal and the output signal to calculate the angle between the heading of the compass and the direction of the magnetic flux lines of the earth's magnetic field in a local area. Methods of determining the angle between the heading of a compass and the direction of the magnetic flux lines of the earth's magnetic field in a local area are also disclosed.

32 Claims, 12 Drawing Sheets

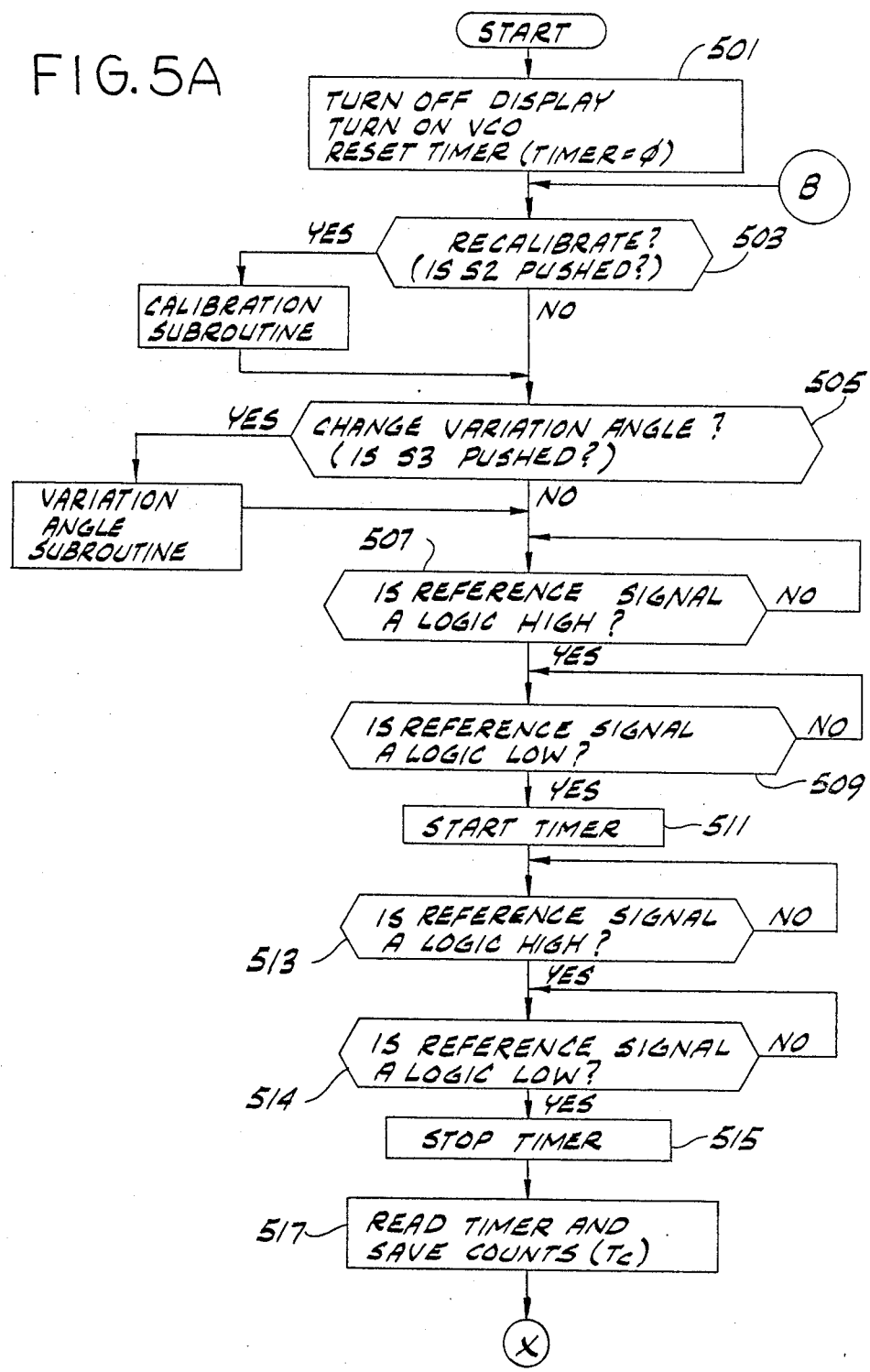

ELECTRONIC COMPASS AND METHOD

BACKGROUND OF THE INVENTION

This invention relates to an electronic compass and method for determining the angle relative to the direction of the magnetic flux lines of the earth's magnetic field in a local area.

Presently available electronic compasses have relatively low accuracy. For example, a compass presently available as an option on some automobiles displays directions such as NE, SE, etc. Such a device, which uses a flux gate system for determining heading of the compass, is not very accurate and is thus unacceptable for applications in which high accuracy is required, e.g., airplanes. Hall effect devices have been suggested to improve the accuracy of electronic compasses. However, the resolution of such compasses has been very poor and compasses have not achieved better than one degree accuracy.

Other presently available devices are adversely effected by the near proximity of ferrous materials. This effect causes a deviation error which, if not corrected, results in inaccurate readings. The compasses described above have not solved the adverse effects of proximate ferrous objects.

SUMMARY OF THE INVENTION

Among the several objects of the invention may be noted the provision of an electronic compass which is highly accurate; the provision of such a compass which corrects for proximate ferrous objects; the provision of such compass which has an accuracy unaffected by environmental changes such as temperature; the provision of such compass which is economically feasible and commercially practical.

Briefly described, an electronic compass of the present invention includes means for generating a control signal and means responsive to the control signal for producing reference signals having a frequency established by the control signal. The compass also includes means for phase shifting the reference signals to generate an output signal shifted by a phase shift which is a function of the angle between a reference heading of the compass and the direction of the magnetic flux lines of the earth's magnetic field in a local area. The compass further includes means for monitoring the frequency of one of the reference signals, for varying the control signal to thereby cause reference signals having a predetermined frequency, and for measuring the phase shift between the monitored reference signal and the output signal to calculate the angle between the heading of the compass and the direction of the magnetic flux lines of the earth's magnetic field in a local area.

Briefly described, methods of the invention operate in ways analogous to the compass as briefly described above.

Other objects and features will be in part apparent and in part pointed out hereinafter.

BRIEF DESCRIPTION OF THE DRAWINGS

FIGS. 4A and 4B are schematics of a power supply switch and power supply for the electronic compass of FIG. 1;

FIGS. 5A, 5B, 5C, 5D and 5E are a flow chart of the main sequence of steps stored in the memory of a microcomputer included in FIG. 2;

Corresponding reference characters indicate corresponding parts throughout the several views of the drawings.

DESCRIPTION OF A PREFERRED EMBODIMENT

Figure 1:
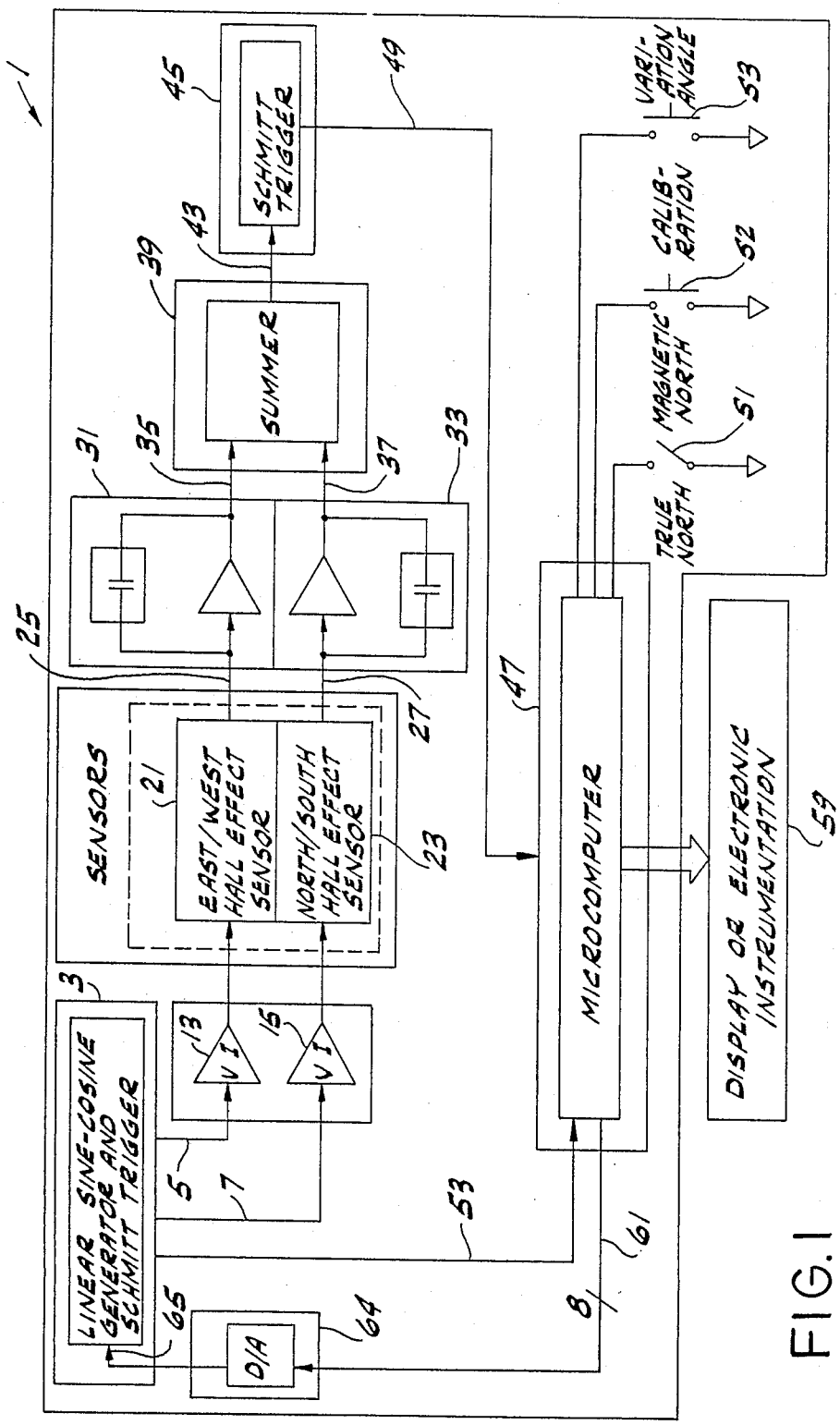
FIG. 1 is a block diagram of the electronic compass of the present invention.

In FIG. 1 an electronic compass 1 of the present invention includes a linear sine-cosine signal generator and Schmitt generator 3 for producing low distortion sine and cosine voltage reference signals and a digital reference signal 53 in phase with the cosine reference signal. Output lines 5 and 7 carry these voltage reference signals, (A1 sin(wt) and A1 cos(wt), respectively, where A1 is the amplitude of the sinusoidal voltage) to voltage to current convertors 13 and 15. The output of convertor 13 is connected to an East/West Hall effect sensor 21 and the output of convertor 15 is connected to a North/South Hall effect sensor 23. Sensors 21 and 23 may be, for example, a commercially available type BH-850 available from F. W. Bell. Sensors 21 and 23 may be mounted on a vehicle, e.g., an auto or boat to move and rotate with the vehicle i.e., fixed with reference to the vehicle. As will be appreciated the sensors 21 and 23 do not have to be aligned in North/South or East/West and these terms are used for convenience only. The output 25 of sensor 21 is a voltage signal whose function is KIB sin(wt) in(X) and the output 27 of sensor 23 is also a voltage whose function is KIB cos(wt) cos(X) where I is the current corresponding to the input voltage, B is the strength of the incoming magnetic field and X is the angle of the field as measured with respect to the earth's magnetic north pole.

The outputs 25 and 27 are buffered, amplified and filtered by corresponding bandpass filters 31 and 33. Outputs 35 and 37 are then summed by summer 39 which has an output 43 which is functionally KIB cos (wt−X). Output 43 is thus a sinusoid with a phaee shift X which is representative of the physical angle between the earth's magnetic field and a reference line or heading of the sensors 21 and 23. Output 43 is then digitized by Schmitt trigger 45 which has an output 49 connected to microcomputer 47.

The sensors 21 and 23, filters 31 and 33, and summer 39 are thus an example of means for phase shifting the reference signals (on outputs 5 and 7) to generate an output signal (on output 43) shifted by a phase shift (X) which is a function of the angle between a reference heading of the compass and the direction of the magnetic flux lines of the earth's magnetic field in a local area.

Microcomputer 47 is also connected to the digital reference signal 53 i.e., Schmitt trigger output of the linear sine-cosine signal generator and Schmitt generator 3. Microcomputer 47 executes a phase shift detection routine (discussed with respect to FIGS. 5A-5E) which uses reference signal output 53 and the output 49 (functionally related to KIB cos (wt−X)) to calculate the angle X. The angle X may then be output (degrees from magnetic north) or converted to degrees from true north (depending on the position of switch S1) and then output to a digital display or other electronic instrumentation 59.

A monitor and control main routine (discussed with respect to FIGS. 5A-5E) is executed by microcomputer 47 for monitoring the frequency of the reference signal output 53 and varying a digital output 61. Digital output 61 is connected to a digital to analog converter 64 which has its analog output connected to a control input 65 of the linear sine-cosine signal generator and Schmitt generator 3. The monitor and control routine will vary the digital output 61 so as to maintain the frequency of the generator 3 at a predetermined frequency e.g., 20 hertz.

The digital to analog converter 64 is thus an example of means for generating a control signal (e.g., analog output). And the linear sine-cosine signal generator and Schmitt generator 3 is an example of means responsive to the control signal for producing reference signals having a frequency established by the control signal.

Microcomputer 47 which executes the monitor and control main routine is thus an example of means for monitoring the frequency of one of the reference signals (reference signal output 53), for varying the control signal (analog output of D/A 64) to thereby cause reference signals having a predetermined frequency, and for measuring the phase shift (X) between the monitored reference signal and the output signal (on output 43) to calculate the angle between the heading of the compass and the direction of the magnetic flux lines of the earth's magnetic field in a local area.

The microcomputer 47 also executes a sequence of instructions for calibrating the compass to minimize the distortion effects due to ferrous materials being in close proximity to the Hall effect sensors 21 and 23. These instructions (discussed with respect to FIGS. 6A-6C) are executed in conjunction with operation of a push button calibration switch S2.

Additionally, the microcomputer 47 executes a sequence of instructions to set the degrees between the magnetic north and true north used in the conversion (when switch S1 is set in the true north position). The series of instructions (discussed with respect to FIGS. 7A-7B) are executed in conjunction with the operation of variation angle switch S3.

Microcomputer 47 also executes a sequence of instructions for calculation of a frequency correction factor Fc to account for error in the predetermined frequency. These instructions are discussed with respect to FIG. 9.

Figure 2:
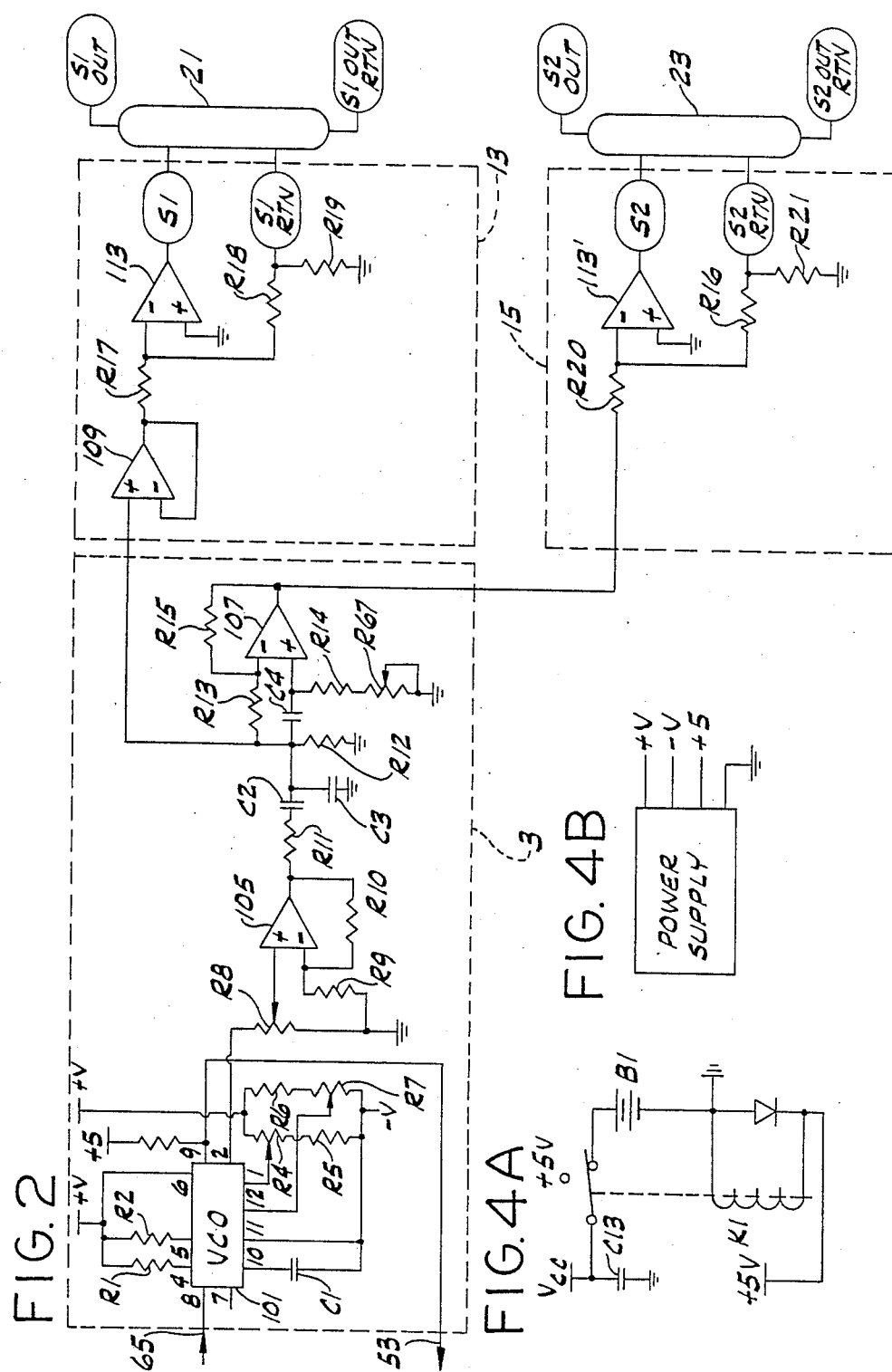
FIG. 2 is a schematic diagram of a portion of the electronic compass shown in FIG. 1.
Figure 3:
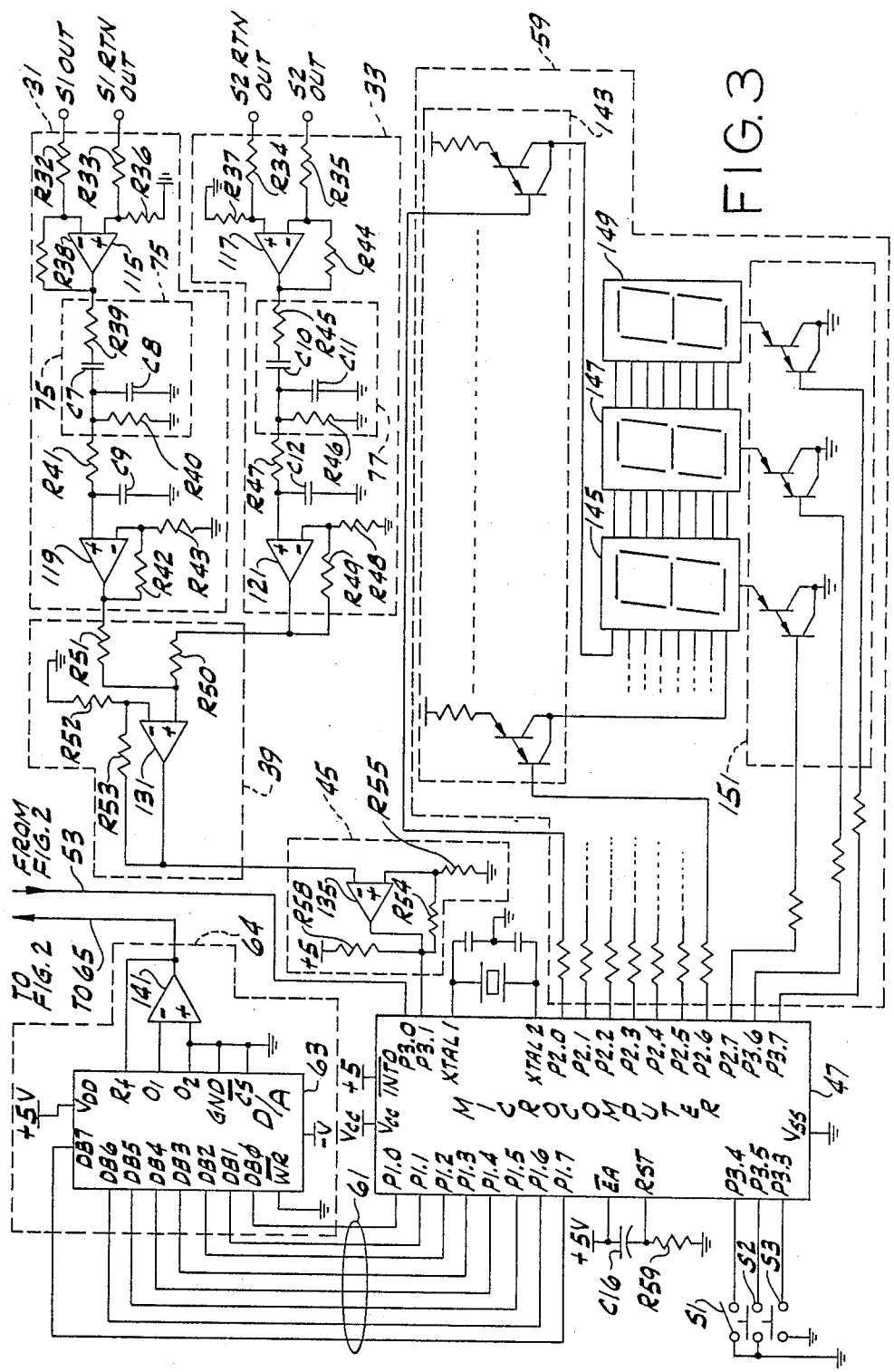
FIG. 3 is a schematic diagram of another portion of the electronic compass shown in FIG. 1.
Figure 5B:
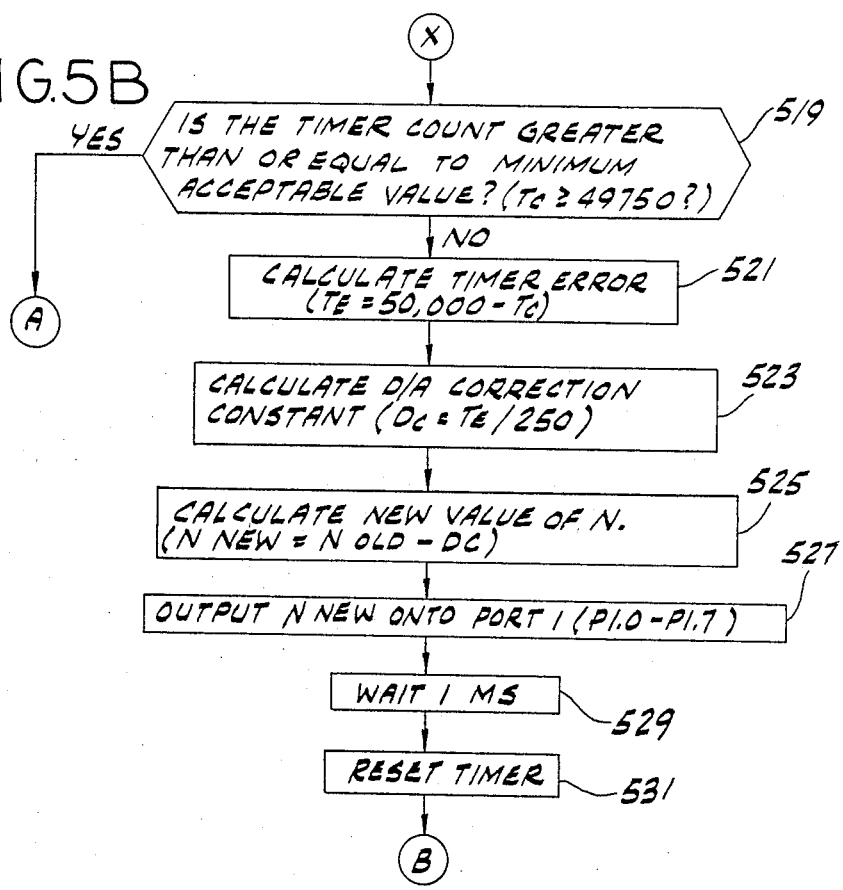

For convenience the following is a table of terms and their definition:

Degrees = Magnetic bearing of vehicle
Mne & Bne = offset correction constants used between north and east headings
Mes & Bes = offset correction constants used between east and south headings
Msw & Bsw = offset correction constants used between south and west headings
Mwn & Bwn = offset correction constants used between west and north headings
Tc = timer count
K = timer count after normalized to predetermined frequency e.g., 20 Hz.
Kn = normalized northern phase angle
Ke = normalized eastern phase angle
Ks = normalized southern phase angle
Kw = normalized western phase angle
Fc = frequency correction (normalization factor)
X = magnetic bearing (phase shifted signal)
Dc = D/A correction constant
Xc = normalized phase shifted signal The circuit of FIGS. 2 and 3 will now be described. In FIG. 2 the linear sine-cosine signal generator and Schmitt generator 3 includes a voltage controlled oscillator VCO 101 which is for example, model ICL 8038 and is capable of producing a sinusoidal output (pin 2) and a squarewave output (pin 9) both of the same frequency and being in phase. The frequency of oscillation for the VCO 101 is determined by resistors R1 (connected between pin 4 and +V) and R2 (connected between pin 5 and +V), capacitor C1 (connected between pin 10 and −V) and the voltage at a control input of VCO 101 (pin 8). For example, the values of R1, R2, and C1 are chosen so that at 10.0 volts at the control input of pin 8 produces a twenty hertz signal at room temperature. The voltage at the control input of VCO 101 will vary as is described in reference to FIGS. 5A-5E.

A 100K ohm potentiometer R4 and 10K ohm resistor R5 are connected in series between +V and −V and a 10K ohm resistor R6 and a 100K ohm potentiometer R7 are also connected in series between +V and −V. The wiper of R4 is connected to pin 1 of VCO 101 and the wiper of R7 is connected to pin 12 of VCO 101. Potentiometers R4 and R7 are adjusted to minimize the distortion at the sinusoidal output (pin 2).

Squarewave output (pin 9) is an open collector output pulled up to +5 Vdc thru resistor R3 thus producing a 5 Vdc peak squarewave which is the reference signal output 53 and is connected to the microcomputer 47. As will be discussed, the microcomputer 47 controls the voltage at the control input (pin 8 of VCO 101) so that a predetermined frequency (e.g., 20 hertz) is maintained at the square wave and sinusoidal outputs.

The sinusoidal output of VCO 111 is connected to a potentiometer R8. The wiper of potentiometer R8 is connected to a positive input of amplifier 105. The negative input of amplifier 105 is connected to resistor R9 and through a feed back resistor R10 to the output of amplifier 105. Amplifier 105, R8, and R10 form a buffer/amplifier for the sinusoidal output (pin 2 of VCO 101) and thus the output of amplifier 105 is also sinusoidal.

The output of amplifier 105 is connected through a resistor R11 and a capacitor C2 to one terminal of parallel connected capacitor C5 and and resistor R12 , the other terminal of which is connected to common. R11, C2, C3, and R12 form a band pass filter having its center frequency at the predetermined frequency (e.g., 20 hertz) and thus the values of these components are respectively: R11=75K ohm, C2=0.1 microfarad, C3=0.1 microfarad and R12=160K ohm.

After passing through the band pass filter the sinusoidal wave is input to the positive input of an amplifier 107 through a capacitor C4 and t the negative input of amplifier 107 through a resistor R13. The positive input of amplifier 107 is connected to common through a series connection of a resistor R14 and a variable resistor R67. The output of amplifier 107 is connected to its negative input through a feed back resistor R15. The circuit which includes amplifier 107, R13, R15, C4, R14, and R67 converts a sine wave to a cosine wave with the values of these components chosen to produce a constant-amplitude ninety degree phase shift network. Thus, for example at a input frequency of 20 Hertz, the waveform at the output of amplifier 107 will be the same amplitude as the sinusoidal wave output from the bandpass filter and will be phase shifted 90 degrees.

The sine wave from the band pass filter and the cosine wave from the output of amplifier 107 are input to respective voltage to current converters 13 and 15. The output of the band pass filter is connected to the positive input of a power operational amplifier 109. One terminal of a resistor R17 is connected to the output of amplifier 109 and a second terminal of R17 is connected to the negative input of amplifier 113. One terminal of a resistor R18 is connected to the second terminal of resistor R17 and a second terminal of R18 is connected through a resistor R19 to common. The positive input of amplifier 113 is connected to common and the negative input of amplifier 109 is connected to its output. Output of the converter 13 is from the output of amplifier 113 (S1) and the second terminal of R18 (S1 RTN).

The converter 15, which is connected to the output of amplifier 107, is similar to the converter 13 and for brevity a detailed description will not be repeated here. The following is list of a component in the converter 13 and its corresponding component in the converter 15: amplifier 109—none; amplifier 113—amplifier 113'; R17—R20; R18—R16; R19—R21. Outputs from the converter 15 are S2 and S2 RTN.

Both converters 13 and 15 were designed to provide up to 300 milliamps peak of drive control current signal for input to the East West Hall effect sensor 21 and the North/South Hall effect sensor 23, respectively. These drive current signals are thus a sine and cosine current waveform, respectively, which provide reference signals to be sent to remotely positioned sensors 21 and 23 through a connecting cable. Such remote position may, in addition to sensors 21 and 23, include bandpass filters 31 and 33, lummer 39 and Schmitt trigger 45 to best insure minimized interference from surrounding ferrous materials and radio frequency interference.

The drive current signal or reference signal from converter 13 is applied to sensor 21 and the drive current s signal or reference signal from converter 15 is applied to sensor 23. Each sensor has an output voltage Vh which is functionally related to the applied drive o control current.

The output voltage Vh of sensor 21 appears at S1 OUT and S1 OUT RTN and is connected to the band pass filter 31. S1 OUT and S1 OUT RTN are connected through resistor R32 and R33, respectively, to a negative input and a positive input of an amplifier 115. The positive input of amplifier 115 is connected through a resistor R36 to common. A feed back resistor R38 is connected between the output of amplifier 115 and the negative input. The output of amplifier 115 is also connected to a band pass filter 75 similar to the band pass filter in the generator 3. The filter 75 is designed to have a center frequency at the predetermined frequency e.g., twenty hertz, and includes resistors R39 and R40 and capacitors C7 and C8. The output of filter 75 is connected through a resistor R41 to a positive input of an amplifier 119. The positive input of amplifier 119 is connected through capacitor C9 to common. A negative input of amplifier 119 is connected to common through a resistor R43 and to the output of amplifier 119 through a feed back resistor R42.

Similarly, the output voltage Vh of sensor 23 appears at S2 OUT and S2 OUT RTN and is connected to the band pass filter 33. The band pass filter 33 is similar to filter 31 but is connected to S1 OUT1 and S1 RTN OUT2. For brevity a detailed discussion will not be repeated here but components in filter 31 and its corresponding component in filter 33 are: amplifier 115—amplifier 117; amplifier 119 —amplifier 121; R32—R35; R33—R34; R36—R37; R38 —R44; R39—R45; R40—R46; R41—R47; R42—R49; R43 —R48; C7—C10; C8—C11; C9—C12; and filter 75—filter 77.

The output of amplifier 119 is connected through a resistor R51 and the output of amplifier 121 is connected through a resistor R50 to a positive input of an amplifier 131. A negative input of amplifier 131 is connected through a resistor R52 to common and through a resistor R53 to the output of amplifier 131. The outputs of amplifiers 119 and 121 is summed using amplifier 131 and resistors R50 through R53. The output of amplifier 131 is related to the sum of the outputs of Hall sensors 21 and 23 by the equation:

$$Vout = Vhew + Vhns$$

where Vout is the output of amplifier 131; Vhew is the output of sensor 21; and Vhns is the output of sensor 23. Vhew and Vhns are related to their respect drive or control currents according to the equations:

$$Vhew = K*I*\sin(wt)*B*\sin X$$

$$Vhns = K*I*\cos(wt)*B*\cos X$$

where K is a constant and is a function of the geometry of the Hall sensor, the ambient temperature and any strain placed on the Hall sensor; I*sin(wt) is the current applied to the input of sensor 21; I*cos(wt) is the current applied to the input of sensor 23; B*sin X is the component of magnetic field perpendicular to sensor 21; and B*cos X is the component of magnetic field perpendicular to sensor 23. The Hall sensor inputs and outputs are isolated from each other to minimize any interference. By substitution the output voltage is:

$$Vout = K*B*I\sin(wt)*\sin X + K*B*I*\cos(wt)*\cos X$$

This equation may be reduced through the use of trigonometric identities to:

$$Vout = K*B*I*\cos(wt - X)$$

Vout is thus sinusoidal and has a phase shift from the sinusoidal output (pin 2) and squarewave output (pin 9) of VCO 101, the phase shift being a direct indication of the physical angle between the earth's magnetic field and a reference line as determined by the position of sensors 21 and 23. Thus the output voltage Vout is functionally related to the earth's magnetic field strength in a local area.

The output of amplifier 131 is connected to the negative input of an amplifier 135. A positive input of the amplifier 135 is connected through a resistor R55 to common and through a resistor R54 to the output of amplifier 135. The output of amplifier 135 is connected through a resistor R58 to the +5 volt supply. The output of amplifier 135 is an open collector and is connected to an input P3.1 of the microcomputer 47. The output of amplifier 135 is a digital signal i.e., a Schmitt trigger output and appears as a square wave.

Microcomputer 47 has eight outputs P1.0–P1.7 connected to eight inputs DB0–DB7 of digital to analog converter 63. Digital to analog converter 63 is for example of type AD7524AD. Inputs DB0–DB7 vary an analog output O1 which is connected to the negative input of amplifier 111. The positive input of amplifier 141 is connected to common. Also connected to common ar a second output O2 of digital to analog converter 63, ground GND and low active chip select CS of digital to analog converter 63. The output of amplifier 141 is connected to the control input 65 of the generator 3.

Switch S1(true or magnetic north), calibration switch S2 and variation angle switch S3 are connected to inputs P3.4, P3.5 and P3.3 of microcomputer 47, respectively. Microcomputer 47 also has seven outputs P2.0–P2.6 connected through seven current amplifiers 143 to corresponding segments of digit displays 145, 147 and 149. Control outputs P2.7, P3.6 and P3.7 are connected through three current amplifiers 151 for enabling the corresponding digit for display. Thus, the microcomputer 47 directly controls the digital display 59. As will be readily appreciated by the skilled worker, an additional digit for display, e.g., for one-tenth degree may be added with an additional control output connected thereto.

Microcomputer 47 also has input external address EA (low active) and reset RST. EA is connected to +5 v and one terminal of a capacitor C16. Another terminal of capacitor C16 is connected to RST and one terminal of a resistor R59 which other terminal is connected to common. The RST input will be discussed further with respect to FIG. 8.

The compass's input power requirements are ±12 Vdc and +5 Vdc as shown in the power supply of FIG. 4B. During power down operation (as discussed with respect to FIG. 8), internal RAM in microcomputer 47 retains its memory with the action of single pole double throw relay K1 and battery B1, see FIG. 4A. When input power is on i.e., the +5 Vdc is on, K1 is energized and the +5 Vdc is directed to a Vcc input and an INTO input of microcomputer 47 (logic high). When the input power goes away, the +5 Vdc goes to 0, INTO to be at a logic low and K1 will be deenergized. When K1 deenergizes, Vcc is switched to the B1 battery voltage thus keeping the internal RAM from losing its contents. A capacitor C13, connected to Vcc, holds up the voltage at Vcc during K1 contact switching.

FIGS. 5A–5E are a flow chart of a main program or sequence of instructions stored in and executed by microcomputer 47. The microcomputer 47 provides several functions: (1) to figure out the magnetic bearing or degrees; (2) to control the frequency of VCO 101; and (3) to aid in initial installation/calibration by permiting entry of a variation angle and by calibrating out errors, e.g., due the proximity of objects. A microcomputer having type number 80C51 was chosen for the embodiment but any equivalent computer can be used.

Figure 7B:
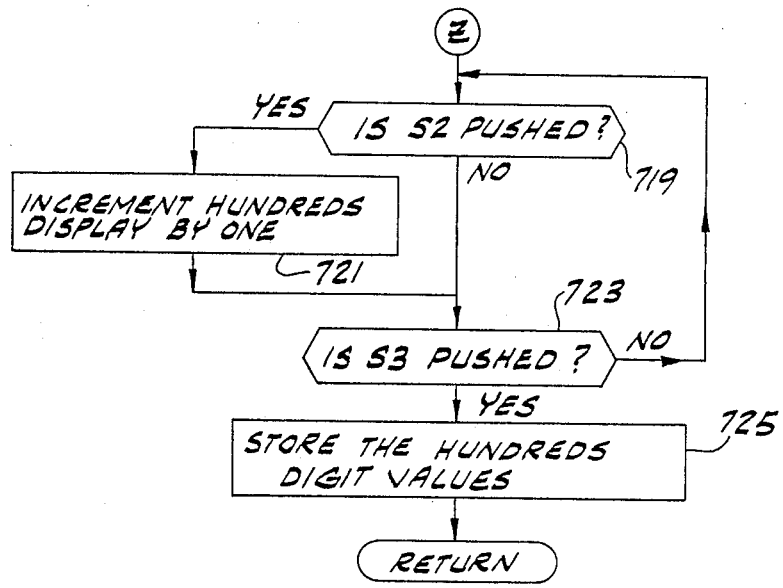
FIGS. 7A and 7B are a flow chart of a variation angle subroutine referred to in FIGS. 5A–5E.
Figure 5D:
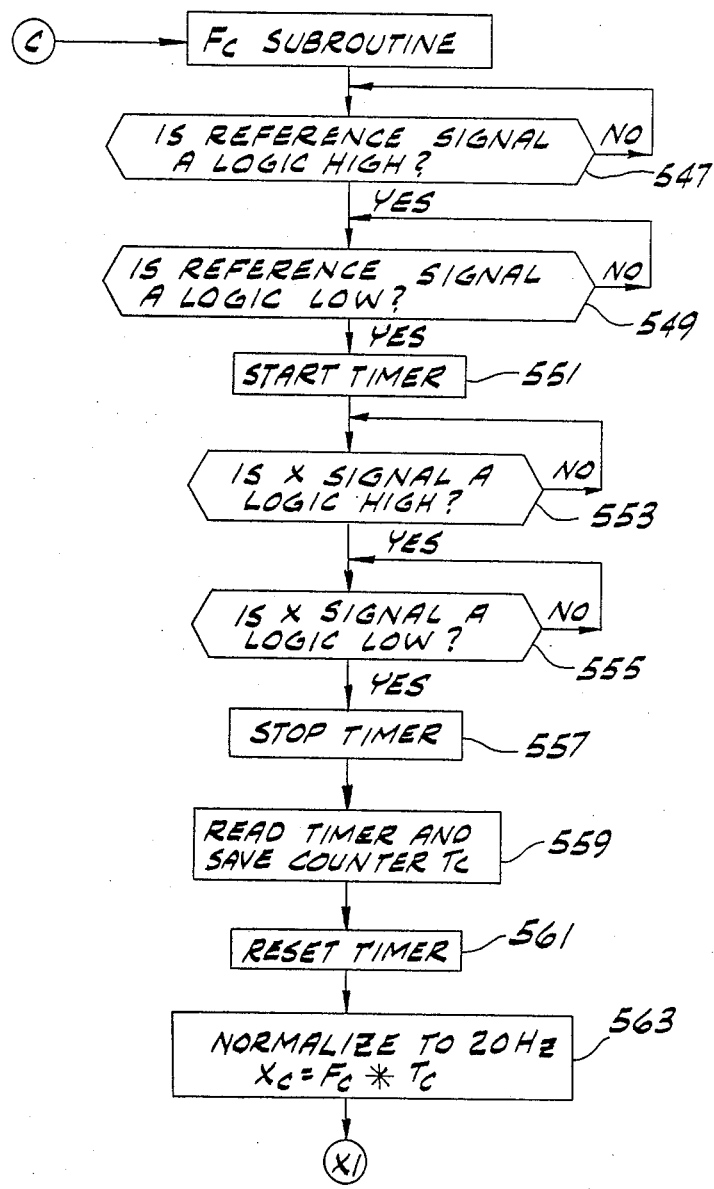
Figure 5E:
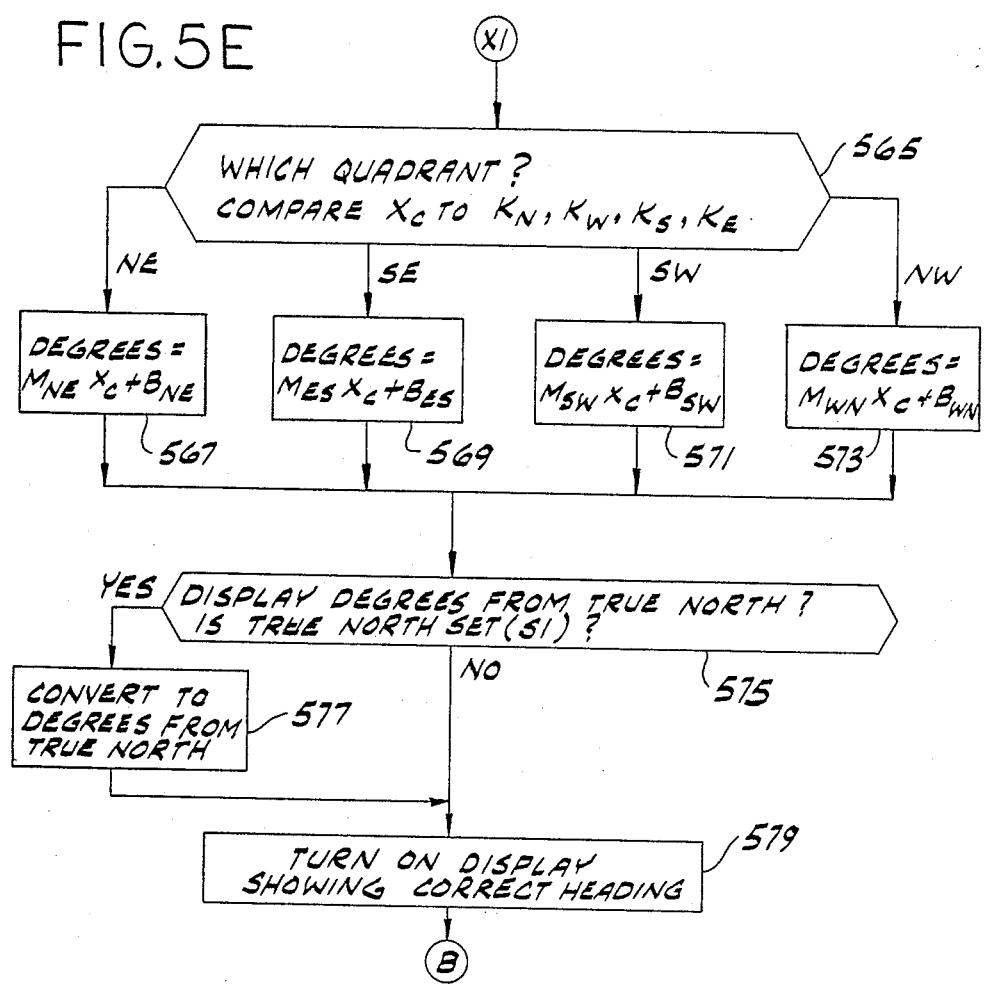
Figure 6C:
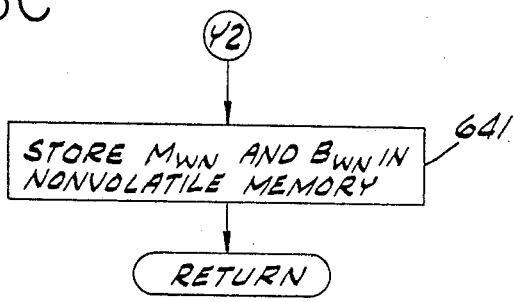
FIGS. 6A, 6B and 6C are a flow chart of a calibration subroutine referred to in FIGS. 5A–5E.
Figure 6A:
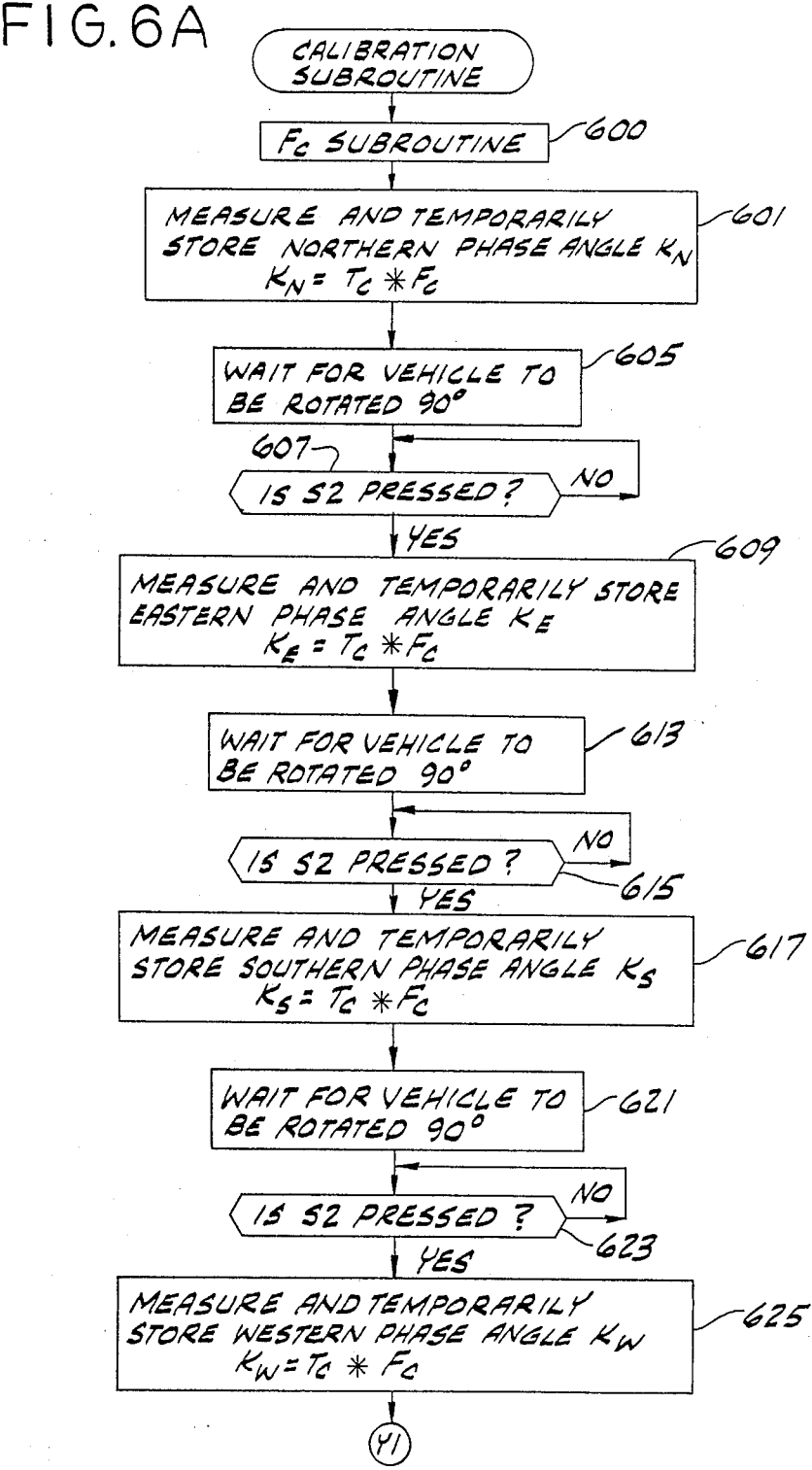
Figure 6B:
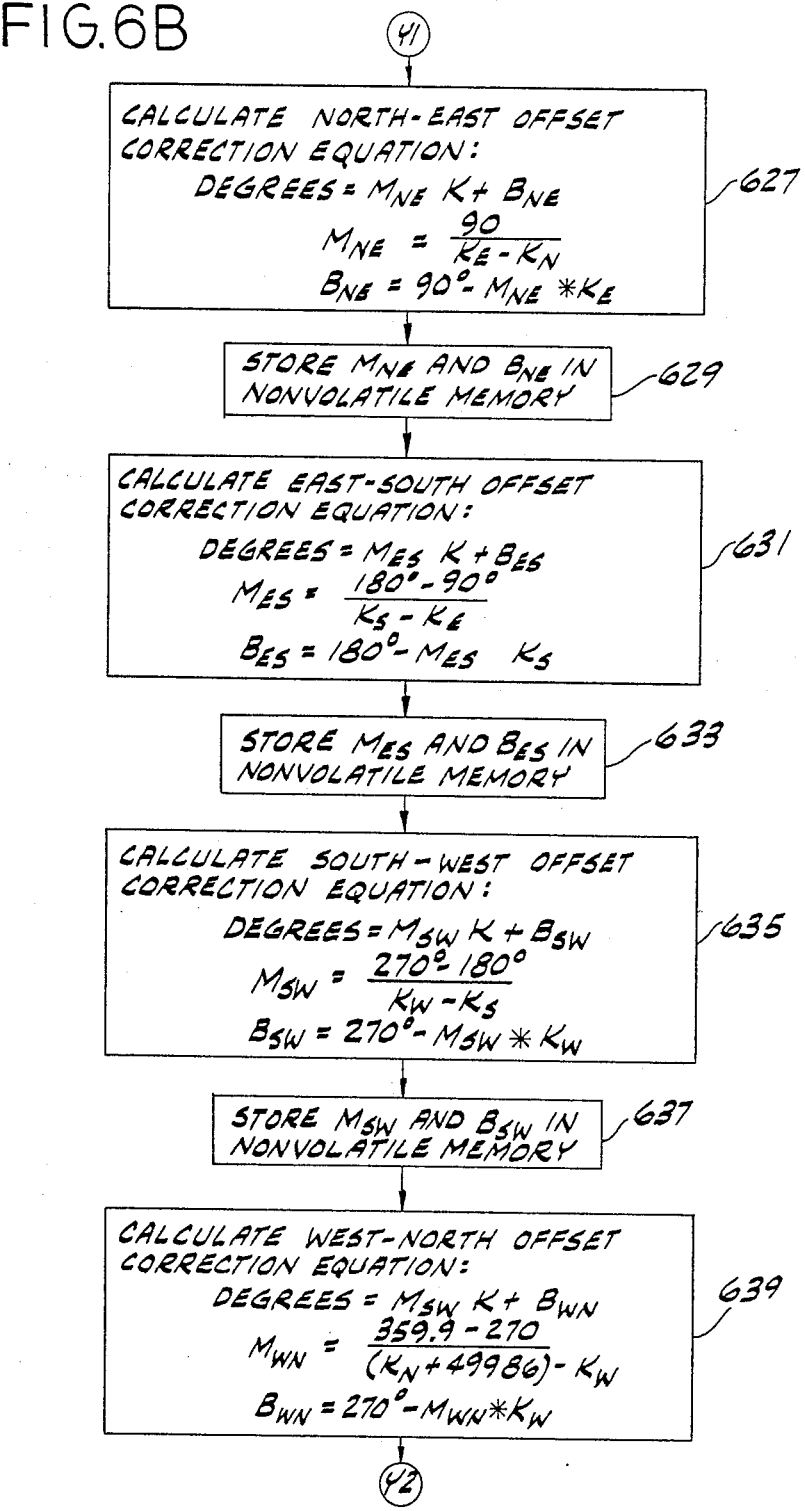
Figure 7A:
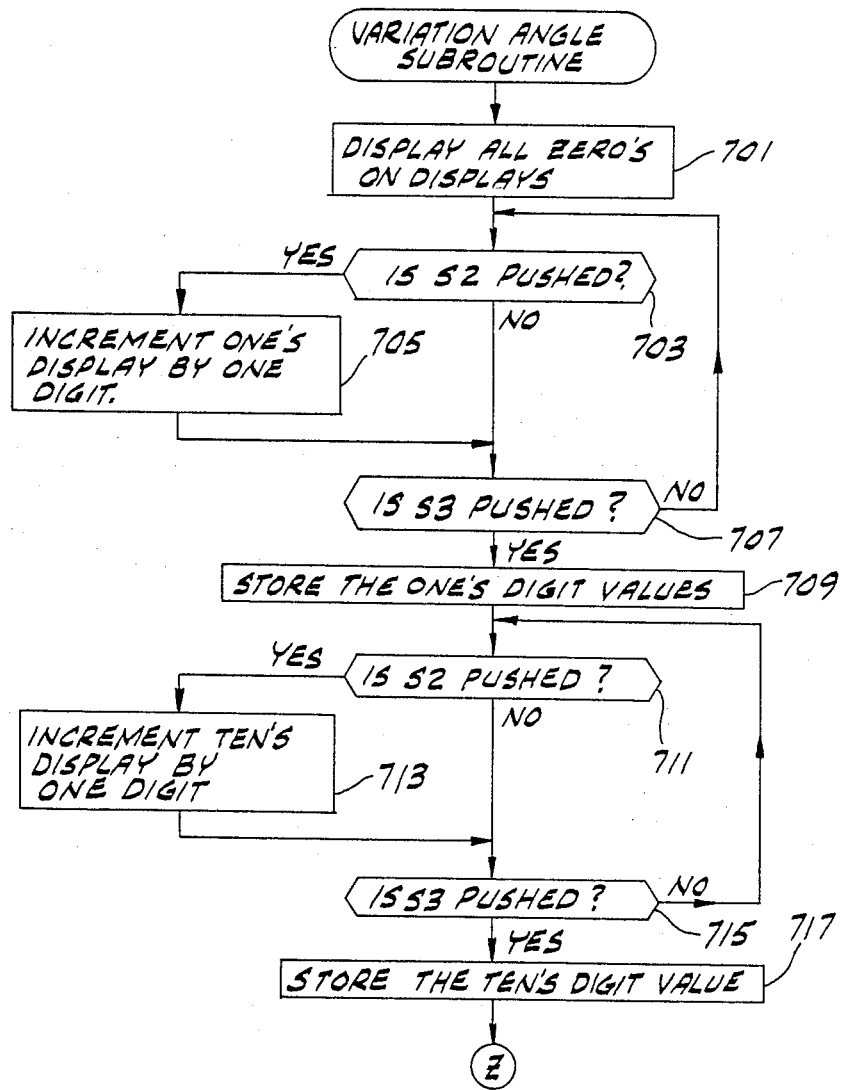

In step 501 the display 59 is turned off, VCO 101 is turned on by setting outputs P1.0–P1.7 to a stored value and an internal timer is set to zero. The switch S2 is checked in step 503 to see if it is desired to recalibrate using the calibration subroutine (FIGS. 6A, 6B and 6C). If switch S2 is not pushed or the calibration subroutine has been completed, it is then inquired in step 505 whether it is desired to change variation angle by checking to see if switch S3 is pushed and if so executing the variation angle subroutine (FIGS. 7A and 7B).

If switch S3 is not pushed or the variation angle subroutine has been completed, it is then inquired in step 507 whether or not the reference signal appearing at P3.0 from reference signal output 53 is at a logic high. Step 507 is executed until the answer is yes and it is then inquired in step 509 whether the reference signal is a logic low. Step 509 is executed until the answer is yes and then in step 511 the timer is started. Next in step 513 the reference signal is tested to see if it is a logic high. Step 513 is executed until the answer is yes and it is then inquired in step 514 whether the reference signal is a logic low. Step 514 is executed until the answer is yes and then in step 515 the timer is stopped.

Next in step 517 the timer is read and saved as a number of counts Tc. In step 519 it is inquired whether or not the count is greater than r equal to a minimum acceptable value e.g., Tc greater than or equal to 49,750. If the answer in step 519 is no, a timer error Te is calculated in step 521 e.g., Te=50 000−Tc. Next in step 523 a D/A correction constant Dc is calculated e.g., Dc=Te/250. In step 52 a new value of N is calculated using the formula Nnew=Nold−Dc. The new value Nnew is then output on P1.0–P1.7 (Port 1) of microcomputer 47 in step 527. A short wait in step 529 of 1 microsecond is then executed to allow the D/A 64 to change based on the changed inputs. In step 531 the timer is reset and processing continues in step 503.

If the answer in step 519 was yes, it is inquired in step 533 whether or not the count Tc is less than or equal to a maximum acceptable value e.g., Tc less than or equal to 50,250. Next in step 535 a timer error Te is calculated e.g., Te=Tc−50,000. In step 537 a D/A correction constant Dc is calculated e.g., Dc=De/250. Then in step 539 a new value of N is calculated using the formula Nnew=Nold+Dc. The new value Nnew is then output on P1.0–P1.7 (Port 1) of microcomputer 47 in step 541. A short wait in step 543 of 1 microsecond is then executed to allow the D/A 64 to change based on the changed inputs. In step 545 the timer is reset and processing continues in step 503.

The frequency of VCO 101 is thus controlled using the microcomputer 47. An eight bit digital word (P1.0–P1.7) is outputted thru the microcomputer's Port 1 to the digital to analog converter 63. Converter 63 converts this digital word into an analog voltage which is applied to input 65 of generator 3. The frequency of the VCO 101 is directly proportional to this voltage. Therefore to change the frequency, the microcomputer changes the binary word at Port 1 (steps 527 and 541). The reference signal output 53 is used by the processor to measure the frequency of VCO 101 (steps 507–517). If the frequency has drifted more than a predetermined amount e.g., +/−0.1 Hz. (see steps 519 and 533), then the digital word is changed to bring the VCO 101 back to the predetermined frequency e.g., 20 Hz.

If the answer in step 533 was yes, the Fc subroutine (discussed with respect to FIG. 9) is executed. Upon return in step 547 it is inquired whether or not the reference signal appearing at P3.0 is at a logic high. Step 547 is executed until the answer is yes and it is then inquired in step 549 whether the reference signal is a logic low. Step 549 is executed until the answer is yes and then in step 551 the timer is started. Next in step 553 the X signal (appearing at P3.1) is tested to see if it is a logic high. Step 553 is executed until a logic high appears and then in step 555 it is inquired whether the X signal has gone to a logic low. Step 555 is executed until the answer is yes and in step 557 the timer is stopped. In step 559 the timer is read and the counter Tc is saved. In step 561 the timer is reset and in step 563 the degrees read are normalized to 20 Hz. using the formula Xc is equal to the frequency correction constant Fc times the count in timer Tc. (See FIG. 9 for calculation of Fc.) The normalized Xc thus corresponds to the phase difference or angle and is directly proportional to the magnetic heading.

In step 565 it is determined which quadrant the value Xc represents. The value Xc is compared with the various values Kn, Kw, Ks and Ke (see FIGS. 6A-6C). Depending on the value of Xc, one of four linear correction equations (see FIGS. 6A-6C) is applied—for the north east quadrant the equation is Degrees=Mne*Xc+Bne (step 567), the south east quadrant the equation is Degrees=Mes*Xc+Bes (step 569), the south west quadrant the equation is Degrees=Msw*Xc+Bsw (step 571) and the north west quadrant the equation is Degrees=Mwn*Xc+Bwn (step 573).

It is then inquired in step 575 whether it is desired to display the degrees from true north by detecting the position of switch S1. If the answer in step 575 is yes, then the degrees from magnetic north are converted to degrees from true north using the variation angle as set using the steps shown in FIGS. 7A and 7B. If the answer in 575 is no or the conversion in step 577 is completed, the display is then turned on in step 579 and the degrees are shown with the correct heading. The program then continues with step 503. Microcomputer 47 which executes the steps of the main control program is thus an example of means for converting the calculated angle to an angle relative to true north.

Figure 9:
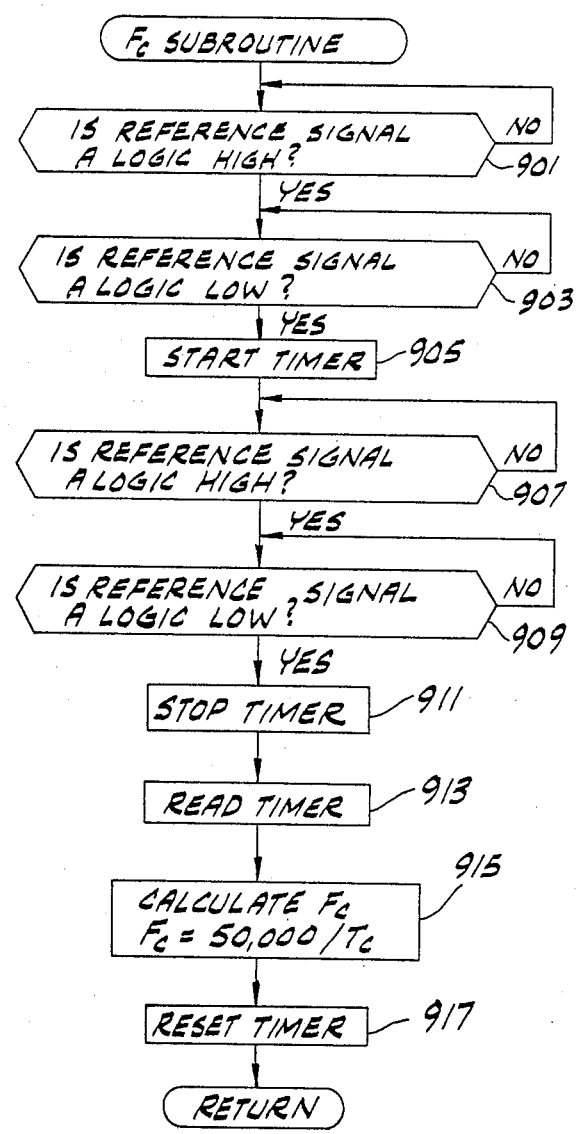
FIG. 9 is a flow chart of a frequency correction calculation subroutine referred to in FIGS. 5A–5E and 6A–6B.

The accuracy of the compass is aided by the calibration subroutine shown in FIGS. 6A, 6B and 6C. Th calibration routine is executed upon installation. This routine with the aid of the installer uses the north, east, south, and west offset or phase shift errors to produce correction constants for application to the measured phase shift. First, the Hall sensors 21 and 23 are located in their desired position on a vehicle e.g., automobile or plane. The vehicle is then pointed or oriented in the north direction. The switch S2 is pushed and in step 503 the answer will be yes and the calibration subroutine in FIGS. 6A, 6B and 6C is executed. In step 600 the frequency correction calculation subroutine of FIG. 9 is executed and the correction constant Fc is returned. In step 601 of the calibration subroutine, a measurement is made of the difference between actual north and the reading as determined by the compass, i.e., phase error. In other words, the compass should have a value corresponding to north (i.e., 0 degrees) but may have a different value, e.g., due the proximity of ferrous materials or misalignment of Hall Effect sensors. This measured northern phase angle Tc is multiplied by Fc and stored as normalized angle Kn. In step 605 the program waits for the vehicle to be rotated 90° to the east.

It is then inquired in step 607 whether or not the switch S2 has been pressed again. Step 607 is executed until S2 is pressed and steps 609 through 613 which are similar to steps 601 through 605 are executed to measure the phase angle for the eastern phase angle and stored as Normalized angle Ke in step 609. A wait for the vehicle to turn 90° is executed in step 613 and step 615 is executed until the switch S2 is again pushed.

In step 617 the vehicle is pointed south and the southern normalized angle calculated using similar steps as outlined above (Ks=Tc*Fc). A wait is made in step 621 for the vehicle to be rotated 90° to point west and step 623 is executed until switch S2 is again pushed. In step 625 the western normalized angle Kw is calculated and stored (Kw=Tc*Fc).

Next in step 627 the constants are calculated for the North-East correction. A linear technique is used to correct the readings (measured phase shift) by calculating a slope (Mne=90/(Ke−Kn)) and an intercept (Bne=90−Mne * Ke). In step 629 the values for Mne and Bne are stored in nonvolatile memory for use in step 567 for correcting degrees in the north-east quadrant. Similarly, in steps 631 and 633 the correction values are calculated for the east - south quadrant (Mes=(180−90) / (Ks−Ke) and Bes=180−Mes * Ks) and stored in nonvolatile memory for use in step 569 for correcting degrees in the east-south quadrant.

In step 635 the constants are calculated for the South-West correction. The slope in this quadrant is Msw=(270−180)/(Ks−Kw)) and the intercept is Bsw=270−Msw* Kw. In step 637 the values for Msw and Bsw are stored in nonvolatile memory for use in step 571 for correcting degrees in the south-west quadrant. For the remaining West-North correction a slightly modified calculation is used. In step 639 the slope is calculated using a heading slightly off due north of 359.9 degrees. Thus the slope is Mwn=(359.9−270)/((Kn+49986)−Kw) and the intercept is Bwn=270−Mwn * Kw where 49986 correspond to the count Tc for 359.9 degrees. In step 641 the values for Mwn and Bwn are stored in nonvolatile memory for use in step 573 for correcting degrees in the west-north quadrant. The processing then returns to step 505.

Microcomputer 47 which executes the steps of the calibration subroutine and main control program is thus an example of means for storing the measured phase shift (K) at predetermined orientations (e.g., N, E, S and W) of the compass to produce correction constants (e.g., Mne and Bne) and for adjusting the measured phase shift (e.g. Xc) by the correction constants. It is also an example of means for storing correction constants corresponding to four quadrants (e.g., NE,-SE,SW,NW) and the adjusting means also determines the quadrant based on the measured phase shift and applies the corresponding constants to the measured phase shift. Further it is an example of means for producing a slope correction constant (e.g., Mne) and an intercept correction constant (e.g. Bne), corresponding to each of the four quadrants and the adjusting means applies the corresponding one of the slope and one of the intercepts to the measured phase shift.

The variation angle (i.e., angle between magnetic north and true north) is entered by pushing switch S3 in step 505 and thus executing the variation angle subroutine shown in FIGS. 7A and 7B. In step 701 display 59 is zeroed and in step 703 it is inquired whether switch S2 is pushed. If the answer in step 703 is yes, the ones digit on the display is incremented by one in step 705. If the answer in step 703 is no or the digit has been incremented in step 705, it is inquired in step 707 whether the switch S3 is pushed. If the answer in step 707 is no, step 703 is executed. If the answer in step 707 is yes, in step 709 the ones digit displayed is stored as the ones digit for the variation angle.

Similar sequences of steps are executed for both the tens and hundreds digits. In step 711 it is inquired whether switch S2 is pushed. If the answer in step 711 is yes, the tens digit on the display is incremented by one in step 713. If the answer in step 711 is no or the digit has been incremented in step 713, it is inquired in step 715 whether the switch S3 is pushed. If the answer in step 715 is no, step 711 is executed. If the answer in step 715 is yes, in step 717 the tens digit displayed is stored as the tens digit for the variation angle. Next, in step 719 it is inquired whether switch S2 is pushed. If the answer in step 719 is yes, the hundreds digit on the display is incremented by one in step 721. If the answer in step 719 is no or the digit has been incremented in step 721, it is inquired in step 723 whether the switch S3 is pushed. If the answer in step 723 is no, step 719 is executed. If the answer in step 723 is yes, in step 725 the hundreds digit displayed is stored as the hundreds digit for the variation angle. The processing then returns to step 507 in FIG. 5A.

Figure 8:
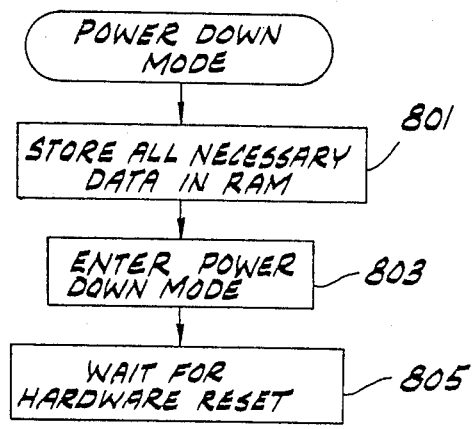
FIG. 8 is a flow chart of a power down mode of the microcomputer in FIG. 2.
Figure 5C:
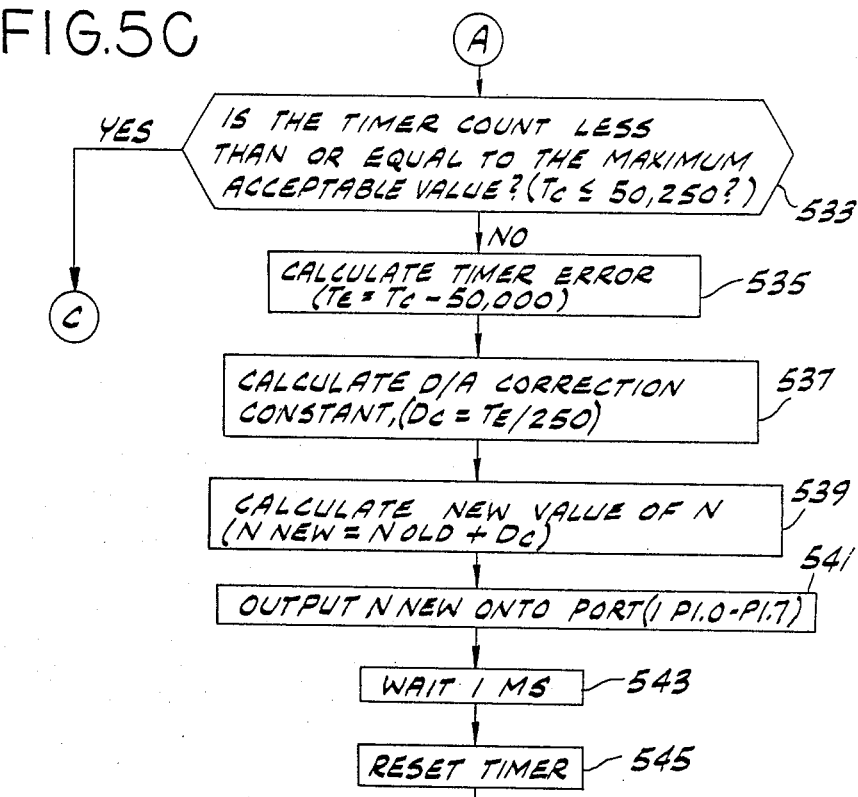

When power is removed at the +5 v as shown in FIG. 4, the microcomputer 47 executes a series of steps as shown in FIG. 8 i.e., Power Down Mode. In step 801 all necessary data is stored in random access memory RAM which will remain powered from back-up battery B1. Such data includes, for example, Kn, Ke, Ks, Kw, Mne, Mes, Msw, Mwn, Bne, Bes, Bsn and Bwn. In step 803 microcomputer 47 enters a power down mode in which power consumption is reduced, thus extending the life of battery B1. In step 805 microcomputer 47 waits until a hardware reset occurs. In the power down mode a logic low will appear at the reset RST input of microcomputer 47. When power returns a hardware reset will occur since RST will go to a logic high. Capacitor C16 will charge through resistor R59 and RST will go to logic low thus completing the hardware reset.

In the correction calculation subroutine (Fc subroutine) of FIG. 9 the frequency correction or normalization factor is calculated. The normalization factor is also used to increase the accuracy of the compass. It is inquired in step 901 whether or not the reference signal appearing at P3.0 from reference signal output 53 is at a logic high. Step 901 is executed until the answer is yes and it is then inquired in step 903 whether the reference signal is a logic low. Step 903 is executed until the answer is yes and then in step 905 the timer is started. Next in step 907 the reference signal is tested to see if it is a logic high.

Step 907 is executed until the answer is yes and it is then inquired in step 909 whether the reference signal is a logic low. Step 909 is executed until the answer is yes and then in step 911 the timer is stopped. Next in step 913 the timer is read i.e., a number of counts Tc. In step 915 the factor Fc is calculated according to the equation Fc=50,000/Tc where 50,000 correspond to the count which would appear at exactly the predetermined frequency e.g., 20 hertz. In step 917 the timer is reset and processing returns to the program which requested the correction subroutine. Microcomputer 47 which executes the frequency correction subroutine and the main control program is thus an example of means for measuring error in the predetermined frequency to produce a correction factor (Fc) and for adjusting the measured phase shift by the correction factor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electronic compass comprising:
   means for generating a control signal;
   means responsive to the control signal for producing reference signals having a frequency established by the control signal;
   means for phase shifting the reference signals to generate an output signal shifted by a phase shift which is a function of the angle between a reference heading of the compass and the direction of the magnetic flux lines of the earth's magnetic field in a local area; and
   means for monitoring the frequency of one of the reference signals, for varying the control signal to thereby cause reference signals having a predetermined frequency, and for measuring the phase shift between the monitored reference signal and the output signal to calculate the angle between the heading of the compass and the direction of the magnetic flux lines of the earth's magnetic field in a local area.

2. The electronic compass of claim 1 wherein the means for monitoring and varying includes a microcomputer.

3. The electronic compass of claim 1 wherein the generating means generates the control signal having a variable voltage and the producing means produces a sinusoidal reference signal.

4. The electronic compass of claim 1 wherein said means for monitoring and varying includes means for storing the measured phase shift at predetermined orientations of the compass to produce correction constants and for adjusting the measured phase shift by the correction constants.

5. The electronic compass of claim 4 wherein said means for monitoring and varying includes means for storing correction constants corresponding to four quadrants and wherein the adjusting means also determines the quadrant based on the measured phase shift and applies the corresponding constants to the measured phase shift.

6. The electronic compass of claim 5 wherein said means for monitoring and varying includes means for producing a slope correction constant and an intercept correction constant, corresponding to each of the four quadrants and said adjusting means applies the corresponding one of the slopes and one of the intercepts to the measured phase shift.

7. The electronic compass of claim 1 wherein said means for monitoring and varying includes means for measuring error in the predetermined frequency to produce a correction factor and for adjusting said measured phase shift by the correction factor.

8. The electronic compass of claim 1 wherein said means for monitoring and varying includes means for converting the calculated angle to an angle relative to true north.

9. The electronic compass of claim 1 wherein said producing means produces first an second reference signals and said phase shifting means includes first mean for phase shifting the first reference signal to generate an a first output signal shifted by a first phase shift which is a function of a first angle between a first direction of the first receiving and phase shifting means and the direction of the magnetic flux lines of the earth's magnetic field in a local area, second means for phase shifting the second reference signal to generate a second output signal shifted by a second phase shift which is a function of a second, angle between a second direction of the second receiving and phase shifting means and the direction of the magnetic flux lines of the earth's magnetic field in a local area, and means for combining the first and second output signals to produce said output signal shifted by a phase shift which is a function of the angle between a first reference heading of the compass and the direction of the magnetic flux lines of the earth's magnetic field in a local area.

10. An electronic compass comprising:
means for generating a control signal;
means responsive to the control signal for producing first and second reference, signals, each having the same frequentcy established by the control signal;
first means for phase shifting the first reference signal to generate a first output signal shifted by a first phase shift which is a function of a first angle between a first direction of the first receiving and phase shifting means and the direction of the magnetic flux lines of the earth's magnetic field in a local area;
second means for phase shifting the second reference signal to generate a-second output signal shifted by a second phase shift which is a function of a second angle between a second direction of the second receiving and phase shifting means and the direction of the magnetic flux lines of the earth's magnetic field in a local area;
means for combining the first and second output signals to produce a third output signal shifted by a phase shift which is a function of the angle between a first reference heading of the compass and the direction of the magnetic flux lines of the earth's magnetic field in a local area; and
means for monitoring the frequency o the first or second reference signal, for varying the control signal thereby to cause first and second reference signals having a predetermined frequency, and for measuring tee phase shift between the reference signal and the third output signal to calculate the angle between the heading of the compass and the direction of the magnetic flux lines of the earth's magnetic field in a local area.

11. Th electronic compass of claim 10 wherein the means for monitoring and varying includes a microcomputer.

12. The electronic compass of claim 10 wherein the generating means generates the control signal having a variable voltage and the producing means produces a sinusoidal reference signal.

13. The electronic compass of claim 10 wherein said means for monitoring and varying includes means for storing the measured phase shift at predetermined orientations of the compass to produce correction constants and for adjusting the measured phase shift by the correction constants.

14. The electronic compass of claim 13 wherein said means for monitoring and varying includes means for storing correction constants corresponding to four quadrants and wherein the adjusting means also determines the quadrant based on the measured phase shift and applies the corresponding constants to the measured phase shift.

15. The electronic compass of claim 14 wherein said phase shift measuring means produces a slope correction constant and an intercept correction constant, corresponding to each of the four quadrants and said adjusting means applies the corresponding one of the slopes and one of the intercepts to the measured phase shift.

16. The electronic compass of claim 10 wherein said means for monitoring and varying includes means for converting the calculated angle to an angle relative to true north.

17. The electronic compass of claim 10 wherein said first and second phase shifting means include respective Hall effect sensors and said combining means includes means for summing the first and second output signals from the Hall effect sensors.

18. The electronic compass of claim 10 wherein said generating means includes a digital to analog converter for generating an analog control voltage and said producing means includes an oscillator responsive to the control voltage for producing first and second sinusoid reference signals, each having the same frequency established by the control voltage and for producing a digital reference signal in phase with and having the same frequency as the first or second reference signal and wherein said monitoring and varying means measures the frequency of the the digital reference signal thereby to cause first and second sinusoid reference signals having the predetermined frequency.

19. An electronic compass comprising:
a digital to analog converter for generating an analog control voltage;
an oscillator responsive to the control voltage for producing a sine reference signal and a cosine reference signal, each having the same frequency established by the control voltage and for producing a digital reference signal in phase with and having the same frequency as the cosine reference signal;
first circuitry for phase shifting the sine reference signal to generate a first output sinusoidal signal shifted by a first phase shift which is a function of a first angle between a first direction of the first circuitry and the direction of the magnetic flux lines of the earth's magnetic field in a local area;
second circuitry for phase shifting the cosine reference signal to generate a second output sinusoidal signal shifted by a second phase shift which is a function of a second angle between a second direction of te second circuitry and the direction of the magnetic flux lines of the earth's magnetic field in a local area, the second direction being perpendicular to the first direction;
circuitry for combining the first and second output sinusoidal signals to produce a third output digital signal shifted by a phase shift which is a function of the angle between a first reference heading of the compass and the direction of the magnetic flux lines of the earth's magnetic field in a local area; and
a computer for monitoring the frequency of the digital reference signal, for producing and varying a digital signal connected to the digital to analog converter thereby to cause sine and cosine reference signals having a predetermined frequency, and for measuring the phase shift between the digital reference signal and the third output signal to calculate the angle between the heading of the compass and the direction of the magnetic flux lines of the earth's magnetic field in a local area.

20. The electronic compass of claim 19 wherein said computer for monitoring and varying includes means for storing the measured phase shift at predetermined orientations of the compass to produce correction constants and for adjusting the measured phase shift by the correction constants.

21. The electronic compass of claim 20 wherein said computer for monitoring and varying includes means for storing correction constants corresponding to four quadrants and wherein the adjusting means also determines the quadrant based on the measured phase shift and applies the corresponding constants to the measured phase shift.

22. The electronic compass of claim 21 wherein said computer for measuring phase shift produces a slope correction constant and an intercept correction constant, corresponding to each of the four quadrants and said adjusting means applies the corresponding one of the slopes and one of the intercepts to the measured phase shift.

23. The electronic compass of claim 19 wherein said computer for monitoring and varying includes means for measuring error in the predetermined frequency to produce a correction factor and for adjusting said measured phase shift by the correction factor.

24. The electronic compass of claim 19 wherein said computer for monitoring and varying includes means for converting the calculated angle to an angle relative to true north.

25. A method of determining the angle between the heading of a compass and the direction of the magnetic flux lines of the earth's magnetic field in a local area comprising the steps of:
generating a control signal;
producing reference signals in response to the control signal having a frequency established by the control signal;
phase shifting the reference signals to generate an output signal shifted by a phase shift which is a function of the angle between a reference heading of the compass and the direction of the magnetic flux lines of the earth's magnetic field in a local area; and
monitoring the frequency of one of the reference signals;
varying the control signal thereby to cause reference signals having a predetermined frequency;
measuring the phase shift between the monitored reference signal and the output signal to calculate the angle between the heading of the compass and the direction of the magnetic flux lines of the earth's magnetic field in a local area.

26. The method of claim 25 further comprising the steps of storing the measured phase shift at predetermined orientations o the compass to produce correction constants and adjusting the measured phase shift by the correction constants.

27. The method of claim 26 further comprising the steps of storing correction constants corresponding to four quadrants and wherein the adjusting step includes determining the quadrant based on the measured phase shift and applying the corresponding constants to the measured phase shift.

28. The method of claim 27 wherein said phase shift measuring step at predetermined orientations produces a slope correction constant and an intercept correction constant, corresponding to each of the four quadrants and said adjusting step includes applying the corresponding one of the slopes and one of the intercepts to the measured phase shift.

29. The method of claim 25 further comprising the steps of measuring error in the predetermined frequency to produce a correction factor and adjusting said measured phase shift by the correction factor.

30. The electronic compass of claim 26 further comprising the step of converting the calculated angle to an angle relative to true north.

31. The electronic compass of claim 9 wherein siad first and second phase shifting means include respective Hall effect sensors and said combining means includes means for summing the first and second output signals from the Hall effect sensors.

32. The compass of claim 19 wherein said first circuitry comprises a first Hall effect sensor, said second circuitry comprises a second Hall effect sensor and said circuitry for combining comprises a summer.

* * * * *